(12) United States Patent
Tatum et al.

(10) Patent No.: US 12,066,072 B1
(45) Date of Patent: Aug. 20, 2024

(54) BREAKAWAY AXLE COUPLING ASSEMBLY FOR OFF-ROAD VEHICLES

(71) Applicants: Samuel Carter Tatum, Greensboro, NC (US); Richard Douglass Tatum, Greensboro, NC (US)

(72) Inventors: Samuel Carter Tatum, Greensboro, NC (US); Richard Douglass Tatum, Greensboro, NC (US)

( * ) Notice: Subject to any disclaimer, the term of this patent is extended or adjusted under 35 U.S.C. 154(b) by 755 days.

(21) Appl. No.: 17/228,103

(22) Filed: Apr. 12, 2021

Related U.S. Application Data

(60) Provisional application No. 63/008,171, filed on Apr. 10, 2020.

(51) Int. Cl.
*F16D 9/06* (2006.01)
*B60B 35/14* (2006.01)
*F16D 1/08* (2006.01)

(52) U.S. Cl.
CPC ............... *F16D 9/06* (2013.01); *B60B 35/14* (2013.01); *F16D 1/0864* (2013.01)

(58) Field of Classification Search
CPC .......... B60B 35/14; F16B 7/048; F16B 7/182; F16C 3/023; F16C 2226/02; F16D 1/0864; F16D 1/087; F16D 9/06; F16D 9/10; Y10T 403/11; Y10T 403/3953; Y10T 403/535; Y10T 403/5713; Y10T 403/5781; Y10T 403/5786; Y10T 403/69; Y10T 403/7067
USPC ........ 464/30, 32; 403/2, 195, 290, 302, 312, 403/313, 344, 374.3
See application file for complete search history.

(56) References Cited

U.S. PATENT DOCUMENTS

| | | | | |
|---|---|---|---|---|
| 155,837 | A * | 10/1874 | Light | F16D 1/0864 403/312 |
| 4,184,345 | A * | 1/1980 | Cutler | F16P 5/005 464/32 |
| 4,196,799 | A * | 4/1980 | Taylor | F02N 11/10 192/113.32 |
| 5,417,399 | A * | 5/1995 | Saito | C03B 37/01486 403/305 |
| 6,059,085 | A * | 5/2000 | Farnsworth | F16D 9/08 464/32 |
| 6,883,604 | B2 * | 4/2005 | Mack | F16D 1/108 464/182 |
| 7,591,356 | B2 * | 9/2009 | Guyader | F16D 9/08 192/56.56 |
| 9,102,205 | B2 | 8/2015 | Kvien et al. | |
| 10,737,547 | B2 | 8/2020 | Deckard et al. | |
| 2005/0137020 | A1 * | 6/2005 | Beechie | F16C 3/03 464/32 |

(Continued)

*Primary Examiner* — Josh Skroupa
(74) *Attorney, Agent, or Firm* — Schwartz Law Firm, P.C.

(57) ABSTRACT

A breakaway axle coupling assembly attaches to a drive axle of an off-road vehicle. The vehicle drive axle includes first and second elongated axle sections. The first axle section has a proximal end operatively connected to the vehicle differential and an opposite distal end. The second axle section has a proximal end operatively connected to a wheel of the vehicle and an opposite distal end. The breakaway axle coupling assembly incorporates first and second couplers located at the distal ends of the first and second axle sections, and including a shear pin joining the first and second couplers together at an intermediate stress concentration point in the vehicle drive axle.

18 Claims, 9 Drawing Sheets

(56) References Cited

U.S. PATENT DOCUMENTS

2012/0231892 A1* 9/2012 Las Navas Garcia ....................... F16D 1/0864
  464/61.1
2015/0354636 A1* 12/2015 Kaneda ................ F16D 1/0864
  464/93

* cited by examiner

BREAKAWAY AXLE COUPLING ASSEMBLY FOR OFF-ROAD VEHICLES

TECHNICAL FIELD AND BACKGROUND OF THE DISCLOSURE

The present disclosure relates broadly and generally to a breakaway axle coupling assembly and method for off-road vehicles, such as recreational side-by-side utility task vehicles.

In exemplary embodiments described herein, the present disclosure enables ready and convenient axle repair in an ORV. Axles in ORVs periodically break due to torsion fatigue failure and other circumstances. Once broken, the failed axle or axle part often slings around during continued operation of the ORV creating a safety hazard and causing potential damage to other drivetrain and suspension components. Upgrading to higher torque axles simply moves the stress concentration point or "weak spot" from the axle shaft to the differential, drive shaft, or transmission-all of which are costly components to repair. In conventional ORVs, axle repair is difficult and the tools required to fix the problem on the trail are most often not available. With the exemplary design of the present disclosure, the ORV axle can be readily repaired using only two tools-a hammer and a punch. Another advantage of the exemplary design is that it allows the axle to fail safely while maintaining full driving capabilities. The only consequence is a loss of traction since power would no longer be transferred to the affected wheel.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a breakaway axle coupling assembly for an off-road vehicle. The off-road vehicle incorporates an engine, a drivetrain and a plurality of wheels. The drivetrain comprises at least one of a front and rear differential and a plurality of (e.g., 2-4) vehicle drive axles. At least one of the vehicle drive axles comprises first and second axle sections. The first axle section has a proximal end operatively connected to the differential and an opposite distal end. The second axle section has a proximal end operatively connected to a wheel of the vehicle and an opposite distal end. The breakaway axle coupling assembly comprises a first coupler located at the distal end of the first axle section of the vehicle drive axle. A second coupler is located at the distal end of the second axle section of the vehicle drive axle. Means are provided for joining the first and second couplers together at an intermediate stress concentration point in the vehicle drive axle. The breakaway axle coupling assembly operatively connects together the distal ends of the first and second axle sections and functions as a safeguard configured to breakaway upon torsion fatigue failure of the vehicle drive axle.

The term "off-road vehicle" (ORV) refers broadly herein to any type of vehicle designed for or capable of cross-country travel on or immediately over land, water, sand, snow, ice, marsh, swampland, or other natural terrain. Exemplary ORVs include sport side-by-side utility or task vehicles, recreational off-highway vehicles, multipurpose off-highway utility vehicles and all-terrain vehicles. All ORVs typically include a steering wheel, engine, drivetrain, 3 or 4 wheels with low-pressure tires, bucket or bench seating with seatbelts, foot pedals, and a roll bar or cage. Many ORVs have multiple seats for up to six riders.

In exemplary embodiments, the ORV differential may comprise an independent assembly operatively connected (via longitudinal drive or prop shaft) to a vehicle transmission; or alternatively, the differential may be combined with the vehicle transmission in a single integrated transaxle.

In exemplary embodiments, the "means for joining" incorporates breakaway structure comprising a shear pin described further herein. Alternatively (or in addition), the exemplary "means for joining" may include other breakaway structure such as complementary male and female parts or joints, collars, bolts, fasteners, screw threads, fittings, and the like.

According to another exemplary embodiment, the first coupler comprises a one-piece split coupler having a male connecting end configured to extend axially beyond the distal end of the first axle section of the vehicle drive axle.

According to another exemplary embodiment, the second coupler comprises a one-piece split coupler having a female connecting end configured to extend axially beyond the distal end of the second axle section of the vehicle drive axle.

According to another exemplary embodiment, the male and female connecting ends of the one-piece first and second couplers define respective pin holes configured to align upon assembly of breakaway axle coupling assembly on the vehicle drive axle.

According to another exemplary embodiment, the means for joining the one-piece first and second couplers comprises a shear pin extending through the aligned pin holes of the male and female connecting ends.

According to another exemplary embodiment, the shear pin incorporates axial-spaced spring loaded balls adapted for holding the shear pin in position within the breakaway axle coupling assembly during operation of the vehicle.

According to another exemplary embodiment, the first coupler defines an internal keyway configured to receive an elongated key located in a recessed keyseat formed with the distal end of the first axle section of the vehicle drive axle.

According to another exemplary embodiment, the second coupler defines an internal keyway configured to receive an elongated key located in a recessed keyseat formed with the distal end of the second axle section of the vehicle drive axle.

According to another exemplary embodiment, the first coupler comprises a two-piece split coupler having cooperating halves configured to fasten together around the distal end of the first axle section of the vehicle drive axle.

According to another exemplary embodiment, the two-piece first coupler further comprises a male connecting end configured to extend axially beyond the distal end of the first axle section of the vehicle drive axle.

According to another exemplary embodiment, the second coupler comprises a two-piece split coupler having cooperating halves configured to fasten together around the distal end of the second axle section of the vehicle drive axle.

According to another exemplary embodiment, the two-piece second coupler further comprises a female connecting end configured to extend axially beyond the distal end of the second axle section of the vehicle drive axle.

According to another exemplary embodiment, the male and female connecting ends of the two-piece first and second couplers define respective pin holes configured to align upon assembly of breakaway axle coupling assembly on the vehicle drive axle.

According to another exemplary embodiment, the means for joining the two-piece first and second couplers comprises a shear pin extending through the aligned pin holes of the male and female connecting ends.

In another exemplary embodiment, the present disclosure comprises an off-road vehicle incorporating an engine, a drivetrain and a plurality of wheels. The drivetrain includes at least one of a front and rear differential and a plurality of (e.g., 2-4) vehicle drive axles. At least one of the vehicle drive axles comprises first and second axle sections. The first axle section has a proximal end operatively connected (either directly or indirectly) to the differential and an opposite distal end. The second axle section has a proximal end operatively connected (either directly or indirectly) to a wheel of the vehicle and an opposite distal end. The off-road vehicle further comprises a breakaway axle coupling assembly operatively connecting together the distal ends of the first and second axle sections of the vehicle drive axle. The breakaway axle coupling assembly comprises a first coupler located at the distal end of the first axle section of the vehicle drive axle. A second coupler is located at the distal end of the second axle section of the vehicle drive axle. Means are provided for joining the first and second couplers together at an intermediate stress concentration point in the vehicle drive axle. The breakaway axle coupling assembly functions as a safeguard configured to breakaway upon torsion fatigue failure of the vehicle drive axle.

In this exemplary embodiment, the "means for joining" incorporates breakaway structure comprising a shear pin described further herein. Alternatively (or in addition), the exemplary "means for joining" may include other breakaway structure such as complementary male and female parts or joints, collars, bolts, fasteners, screw threads, fittings, and the like.

In yet another exemplary embodiment, the present disclosure comprises a method for managing torsion fatigue failure in a drive axle of an off-road vehicle. The off-road vehicle incorporates an engine, a drivetrain and a plurality of wheels. The drivetrain include at least one of a front and rear differential and a plurality of (e.g., 2-4) vehicle drive axles, each drive axle comprising first and second axle sections. The first axle section has a proximal end operatively connected (either directly or indirectly) to a differential of the vehicle and an opposite distal end. The second axle section has a proximal end operatively connected (either directly or indirectly) to a wheel of the vehicle and an opposite distal end. The method comprises using a breakaway axle coupling element, operatively interconnecting the distal ends of the first and second axle sections of the vehicle drive axle. Torsional stress of the vehicle drive axle is concentrated at the breakaway axle coupling element, such that a fracture occurs at the breakaway axle coupling element upon torsion fatigue failure of the drive axle. After failure, the fractured breakaway axle coupling element is replaced with an unfractured breakaway axle coupling element. In exemplary embodiments, the breakaway axle coupling element comprises a shear pin.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
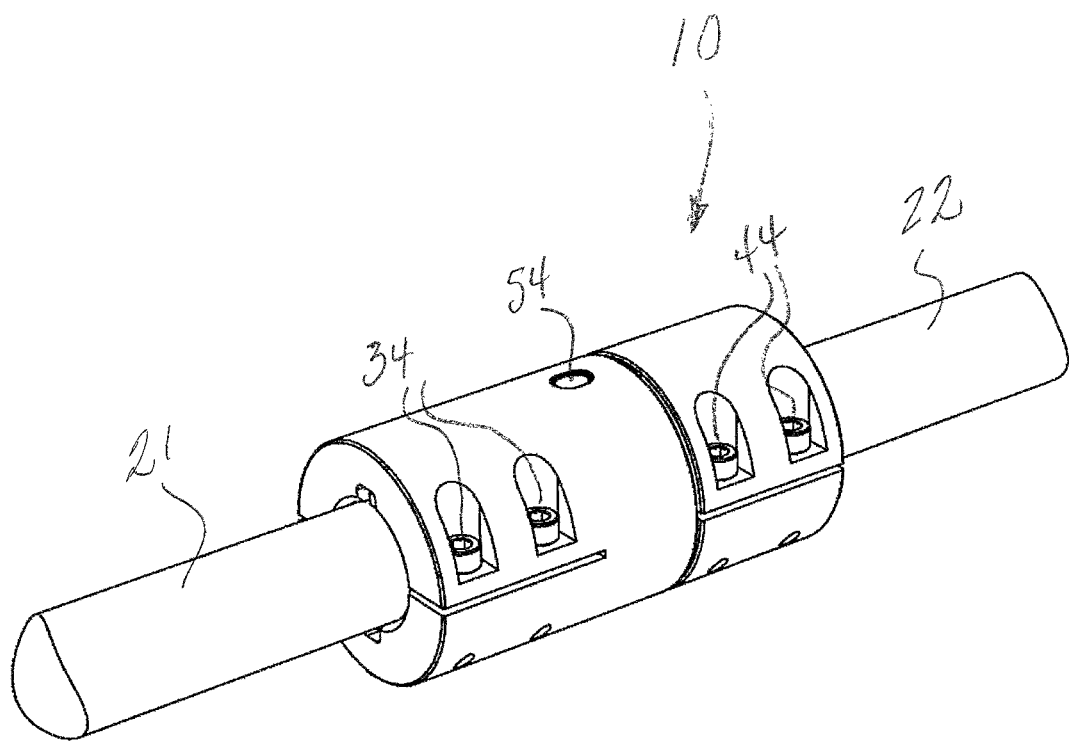
FIG. 1 is a perspective view of a breakaway axle coupling assembly according to one exemplary embodiment of the present disclosure.
Figure 2:
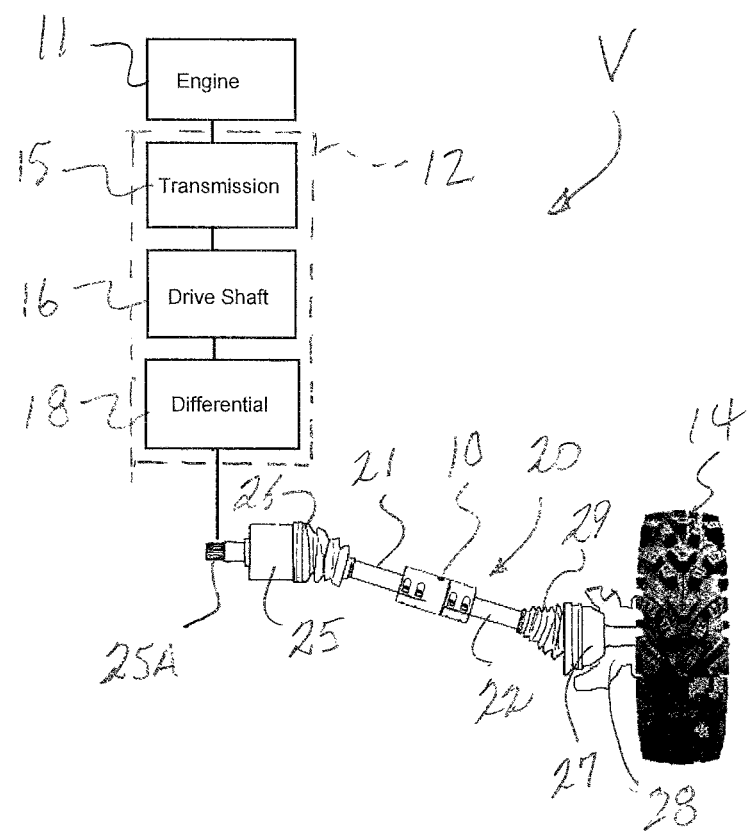
FIG. 2 is diagrammatic illustration of an exemplary utility task vehicle incorporating the present breakaway axle coupling assembly.

Referring now specifically to the drawings, a breakaway axle coupling assembly for off-road vehicles is illustrated in FIGS. 1 and 2, and shown generally at broad reference numeral 10. The present assembly is especially applicable for use on recreational side-by-side utility task vehicles, such as those manufactured and sold by Polaris Industries, Inc. of Medina, Minnesota USA. Examples of such vehicles are disclosed in prior United States patents, U.S. Pat. Nos. 9,102,205 and 10,737,547. The complete disclosures of these prior patents are incorporated by reference herein. As represented diagrammatically in FIG. 2, the utility task vehicle "V" incorporates conventional steering, frame, parts and features including (among others) engine 11, drivetrain 12 and wheels 14. The exemplary drivetrain 12 likewise incorporates conventional parts including a transmission 15, drive shaft 16 and differential 18. In one embodiment, the transmission 15 may comprise an continuously variable transmission (CVT). In alternative embodiments, the transmission 16 and differential 18 are combined together in a single integrated transaxle.

Figure 3:
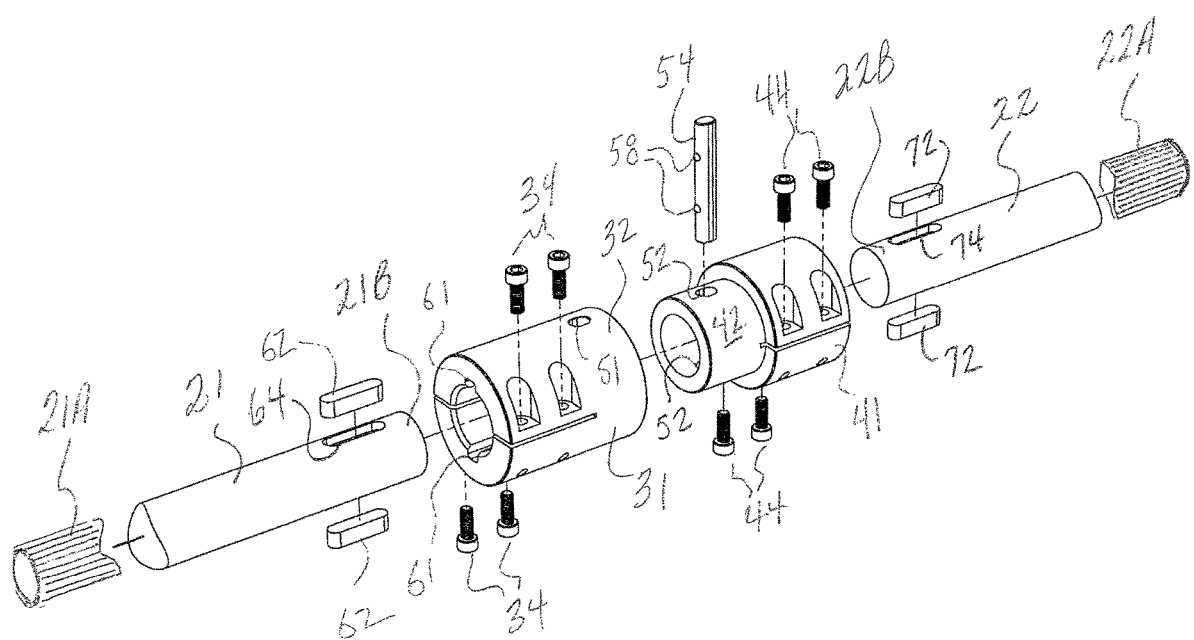
FIG. 3 is an exploded perspective view of the exemplary breakaway axle coupling assembly.
Figure 4:
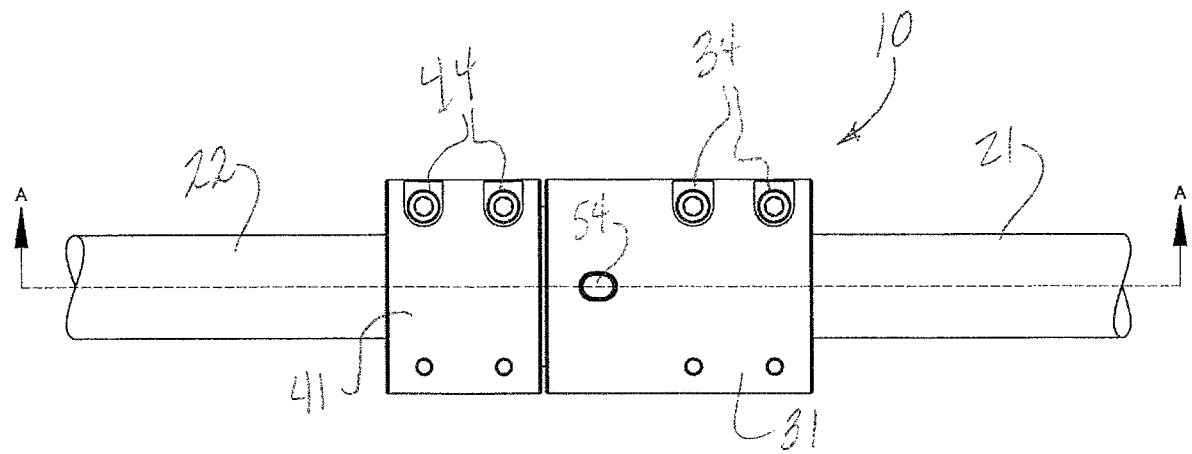
FIG. 4 is an elevation view of the exemplary breakaway axle coupling assembly located on distal ends of inboard and outboard axle sections of the vehicle drive axle.
Figure 5:
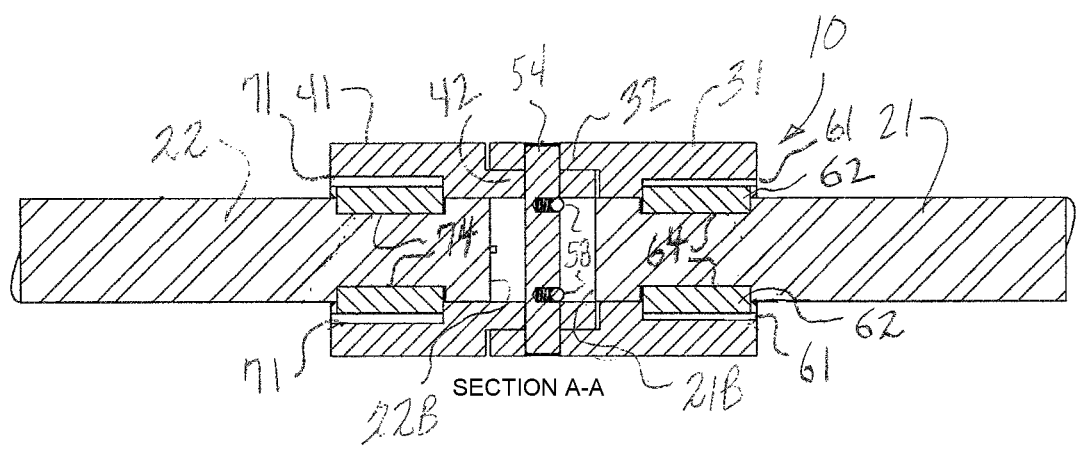
FIG. 5 is a cross-sectional view taken substantially along line A-A in FIG. 4.
Figure 6A:
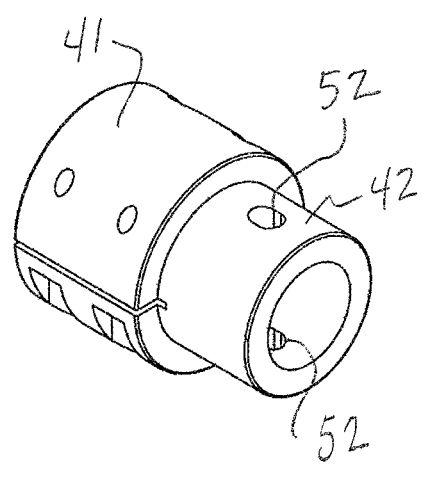
FIGS. 6A and 6B are perspective views of the first and second couplers of the breakaway axle coupling assembly.
Figure 6B:
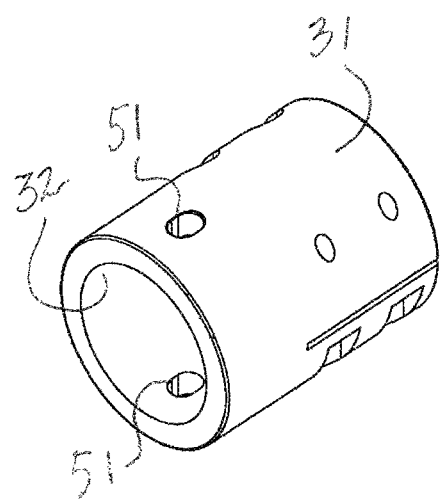
Figure 7:
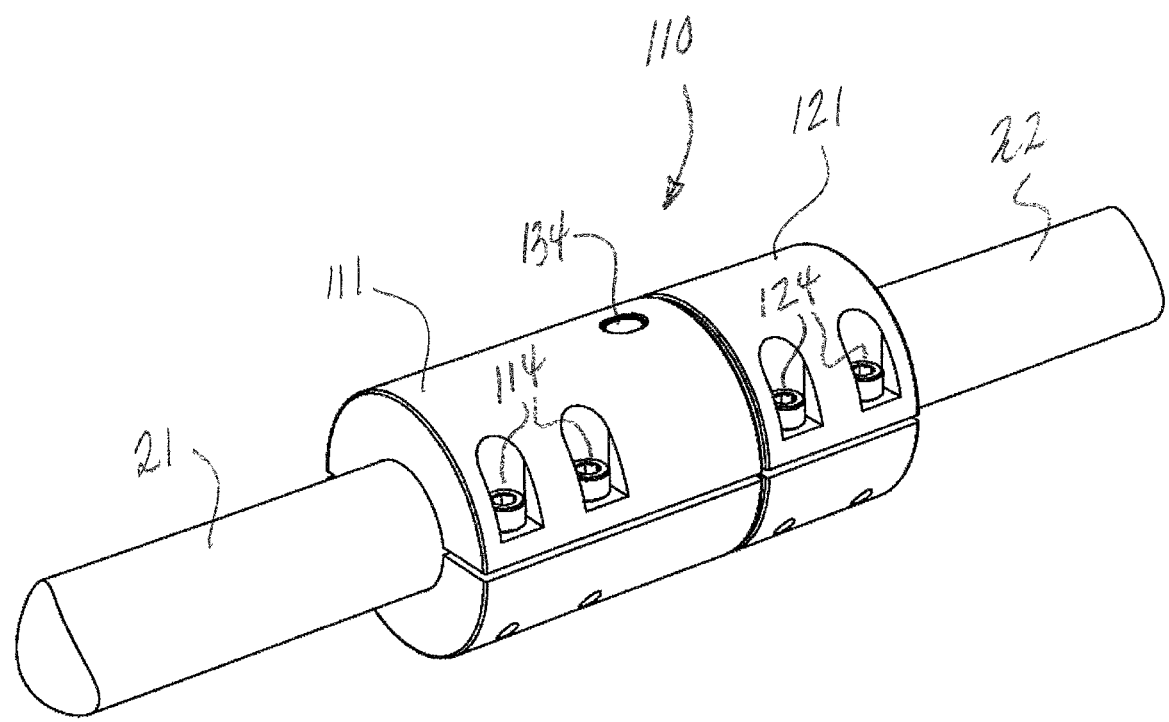
FIG. 7 is a perspective view of a breakaway axle coupling assembly according to a second exemplary embodiment of the present disclosure.

The drivetrain 12 of the exemplary task vehicle further comprises pairs of front and rear drive axles—each front and rear pair including a left side axle and a right side axle. As best shown in FIGS. 2 and 3, the exemplary vehicle drive axle 20 of the present disclosure comprises elongated inboard and outboard axle sections 21, 22. The inboard axle section 21 has a proximal end 21A operatively connected (directly or indirectly) to the differential 18 and an opposite distal end 21B. The outboard axle section has a proximal end 22A operatively connected (directly or indirectly) to a wheel 14 of the vehicle and an opposite distal end 22B. The proximal end 21A of the inboard axle section 21 is splined and configured to insert into a complementary-splined internal bearing cage of an inboard CV joint 25. The splined stub 25A of the CV joint 25 operatively connects to the vehicle differential 18 (or transaxle). A flexible accordion boot 26 covers the connection point of the axle section 21 and CV joint 25, and functions to prevent the entry of dirt, rock or other debris into the joint. The proximal end 22A of the outboard axle section 22 is splined and configured to insert into a complementary-splined internal bearing cage of an outboard joint 27. The outboard joint 27 operatively connects to the vehicle spindle and wheel hub assemblies 28. Like boot 26, a similar accordion boot 29 covers the connection point of the axle section 22 and outboard joint 27, and functions to prevent the entry of dirt, rock or other debris into the joint.

Referring to FIGS. 2, 3, 4 and 5, the present breakaway axle coupling assembly 10 operatively connects together the distal ends 21B, 22B of the inboard and outboard axle sections 21, 22, as discussed further below, and functions as a safeguard configured to fracture upon torsion fatigue failure of the drive axle 20. In one exemplary embodiment, the axle coupling assembly 10 comprises a first one-piece split coupler 31 located on the distal end 21B of the inboard axle section 21 and having a female connecting end 32 configured to extend axially beyond the distal end 21B—See FIG. 5. Standard socket head cap screws 34 or other fasteners are used to removably attach the coupler 31 to the axle section 21. A second one-piece split coupler 41 is located on the distal end 22B of the outboard axle section 22 and has a male connecting end 42 configured to extend axially beyond the distal end 22B-See FIGS. 2 and 5. Like first coupler 31, standard socket head cap screws 44 or other fasteners are used to removably attach the second coupler 41 to the axle section 22.

As best shown in FIGS. 3, 5 and 6A, 6B, the mating connecting ends 32, 42 of the couplers 21, 22 define respective pin holes 51, 52 configured to align upon assembly of breakaway axle coupling assembly 10 on the vehicle drive axle 20. A replaceable shear pin 54 extends through the aligned pin holes 51, 52 of the mating connecting ends 32, 42 to operatively join together the couplers 31, 41 at an intermediate stress concentration point in the vehicle drive axle 20. The exemplary shear pin 54 is held in place during operation of the vehicle by axial-spaced spring loaded balls 58. In exemplary embodiments, the first coupler 31 defines opposing internal keyways 61 (FIG. 3) configured to receive elongated keys 62 located in opposing recessed keyseats 64 formed with the distal end 21B of the inboard axle section 21. Similarly, the second coupler 41 defines opposing internal keyways 71 configured to receive elongated keys 72 located in opposing recessed keyseats 74 formed with the distal end 22B of the outboard axle section 22.

The keys 62, 72 function to resist torsion stress/fatigue of the vehicle drive axle 20 such that any failure of the drive axle 20 during operation of the vehicle occurs at the replaceable shear pin 54—or intermediate stress concentration point. Upon fracture of the shear pin 54, the screws 34, 44 and keys 62, 72 cooperate to maintain attachment and proper axial alignment of the first and second couplers 31, 41 on the inboard and outboard axle sections 21, 22, such that the breakaway axle coupling assembly 10 remains substantially assembled on, and mechanically connected to, the vehicle drive axle 20 but for the fractured shear pin 54. In this event, during continued operation of the vehicle, the inboard axle section 21 (operatively connected to the vehicle differential) continues to rotate while the outboard axle section 22 remains substantially stationary or "freewheeling". Although no drive power is transferred to the wheel 14 of failed drive axle 20, the vehicle can be safely driven for a short distance to a garage or shop for repair. The present breakaway axle coupling assembly 10 also allows for ready and convenient field repair by simply extracting the fractured shear pin 54 and inserting a replacement pin.

A further exemplary embodiment of the disclosure is illustrated in FIGS. 7-10,11A, 11B. Like elements referred to below have the same reference numerals indicated above. As previous described, the breakaway axle coupling assembly 110 operatively connects together the distal ends 21B, 22B of the inboard and outboard axle sections 21, 22, and functions as a safeguard configured to breakaway upon torsion fatigue failure of the drive axle 20. In this embodiment, the axle coupling assembly 110 comprises a first two-piece split coupler 111 located on the distal end 21B of the inboard axle section 21, and when assembled forms a female connecting end 112 configured to extend axially beyond the distal end 21B-See FIG. 10. The coupler 111 has identical cooperating halves 111A, 111B which removably fasten together around the axle section 21 using standard socket head cap screws 114 or other fasteners. A second two-piece split coupler 121 is located on the distal end 22B of the outboard axle section 22, and when assembled forms a male connecting end 122 configured to extend axially beyond the distal end 22B-See FIG. 10. Like first coupler 111, the second coupler 121 has identical cooperating halves 121A, 121B which removably fasten around the axle section 22 using standard socket head cap screws 124 or other fasteners.

Figure 8:
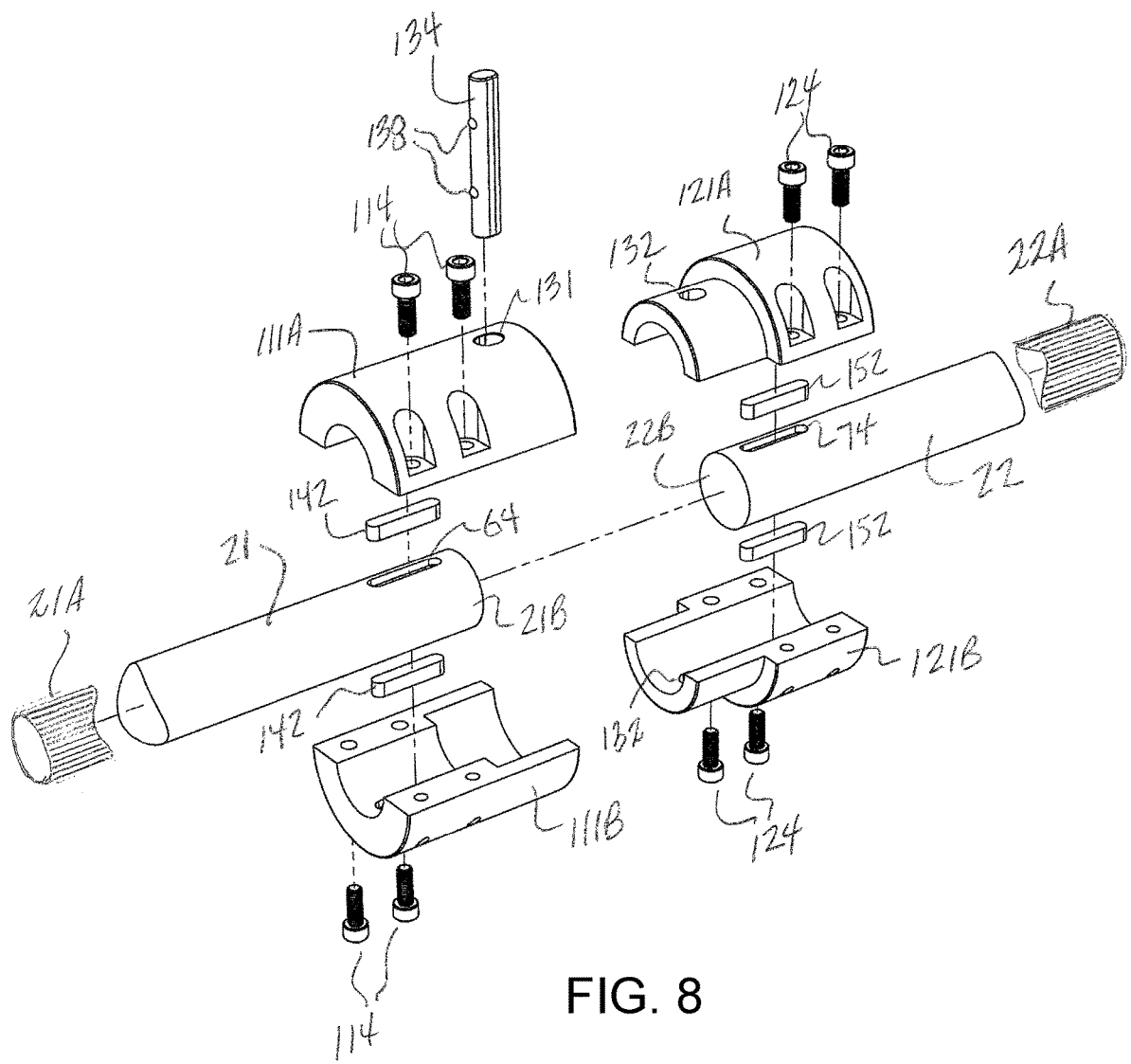
FIG. 8 is an exploded perspective view of the alternative breakaway axle coupling assembly.
Figure 9:
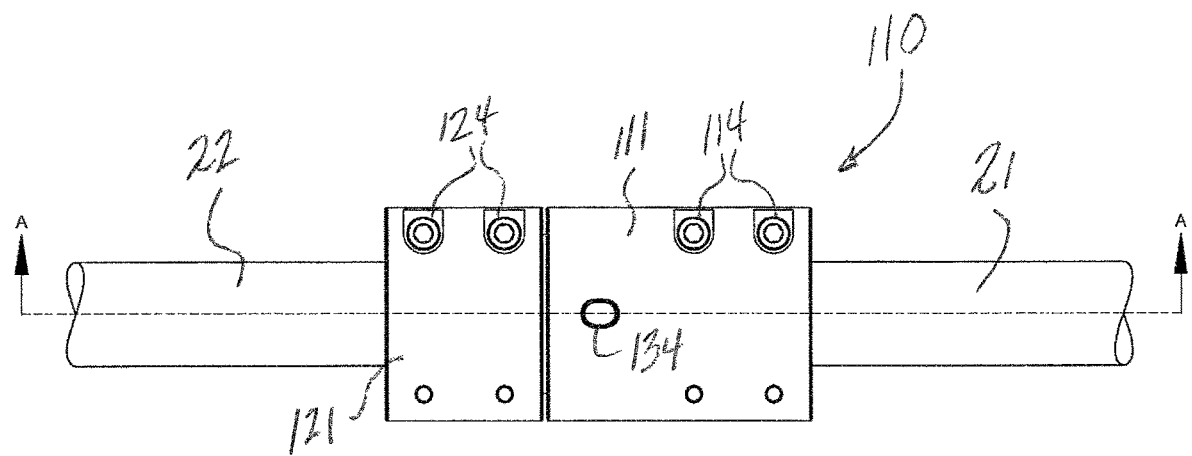
FIG. 9 is an elevation view of the alternative breakaway axle coupling assembly located on distal ends of inboard and outboard axle sections of the vehicle drive axle.
Figure 10:
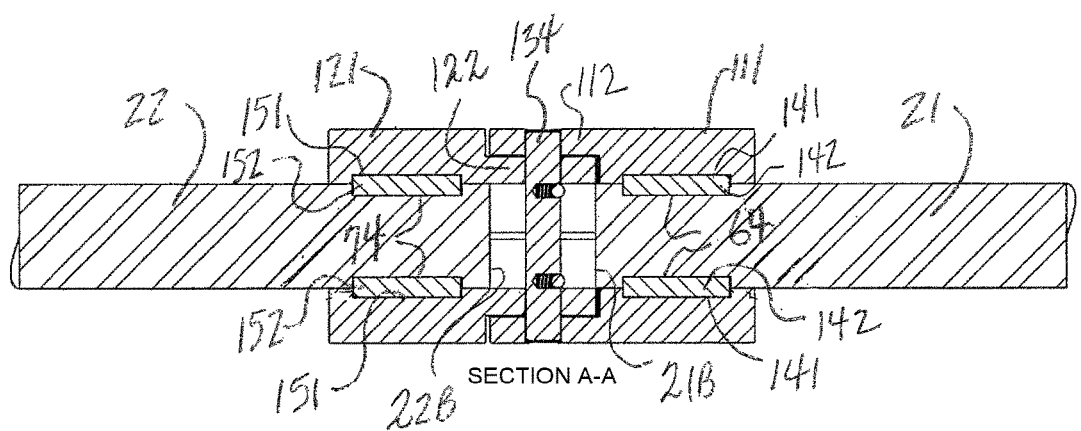
FIG. 10 is a cross-sectional view taken substantially along line A-A in FIG. 9.
Figure 11A:
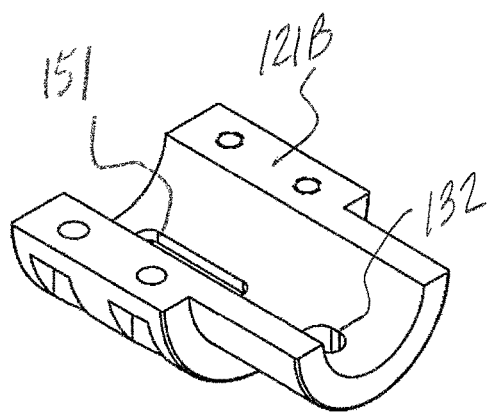
FIGS. 11A and 11B are perspective views of the first and second couplers of the breakaway axle coupling assembly.
Figure 11B:
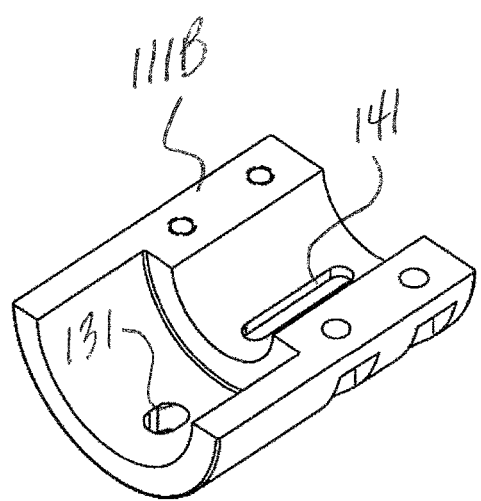

As best shown in FIGS. 8 and 10, the mating connecting ends 112, 122 of the couplers 111, 121 define respective pin holes 131, 132 configured to align upon assembly of breakaway axle coupling assembly 110 on the vehicle drive axle 20. A replaceable shear pin 134 extends through the aligned pin holes 131, 132 of the mating connecting ends 112, 122 to operatively join together the couplers 111, 121 at an intermediate stress concentration point in the vehicle drive axle 20. The exemplary shear pin 134 is held in place during operation of the vehicle by axial-spaced spring loaded balls 138. In exemplary embodiments, the first coupler 111 defines opposing internal keyways 141 (FIGS. 10, 11A, 11B) configured to receive elongated keys 142 located in the opposing recessed keyseats 64 formed with the distal end 21B of the inboard axle section 21. Similarly, the second coupler 121 defines opposing internal keyways 151 configured to receive elongated keys 152 located in the opposing recessed keyseats 74 formed with the distal end 22B of the outboard axle section 22.

The keys 142, 152 function, as previously described, to resist torsion stress/fatigue of the vehicle drive axle 20 such that any failure of the drive axle during operation of the vehicle occurs at the replaceable shear pin 134—or intermediate stress concentration point. Upon fracture of the shear pin 134, the screws 114, 124 and keys 142, 152 cooperate to maintain attachment and proper axial alignment of the first and second couplers 111, 121 on the inboard and outboard axle sections 21, 22, such that the breakaway axle coupling assembly 110 remains mechanically and operatively joined to the vehicle drive axle 20 but for the fractured shear pin 134. In this event, during continued operation of the vehicle, the inboard axle section 21 continues to rotate while the outboard axle section 22 is allowed to "freewheel" while mechanically connected to but operatively disengaged from the inboard axle section.

In each of the exemplary embodiments described above, a removable safety cover may be applied to the breakaway axle coupling assembly to contain any fractured parts of the failed drive axle during operation of the vehicle. Additionally, multiple pin holes may be formed in the mating couplers of the breakaway axle coupling assembly to enable convenient replacement of the shear pin at multiple rotation positions. Exemplary shear pins may have different load ratings-all of which would be applicable in the present breakaway axle coupling assembly. In alternative retrofit applications, the existing vehicle drive axle may be severed at a midpoint and the present breakaway axle coupling assembly installed as described above. The present breakaway axle coupling assembly may be applied to only a single drive axle of the vehicle or to all drive axles. Additionally, a PTFE or other low friction coating may be applied to contacting surfaces of the first and second couplers to facilitate spinning of one coupler relative to the other in the event the drive axle fails at the shear pin.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A breakaway axle coupling assembly for an off-road vehicle, the off-road vehicle incorporating an engine, a drivetrain and a plurality of wheels, and the drivetrain including at least one of a front and rear differential and a plurality of vehicle drive axles, at least one of the vehicle drive axles comprising first and second axle sections, the first axle section having a proximal end operatively connected to the differential and an opposite distal end, and the second axle section having a proximal end operatively connected to a wheel of the vehicle and an opposite distal end, said breakaway axle coupling assembly comprising:

a first coupler for being located at the distal end of the first axle section of the vehicle drive axle, and wherein said first coupler comprises a one-piece split coupler having a male connecting end configured to extend axially beyond the distal end of the first axle section of the vehicle drive axle;

a second coupler for being located at the distal end of the second axle section of the vehicle drive axle; and means for joining said first and second couplers together at an intermediate stress concentration point in the vehicle drive axle, such that said breakaway axle coupling assembly operatively connects together the distal ends of the first and second axle sections and functions as a safeguard configured to breakaway upon torsion fatigue failure of the vehicle drive axle.

2. The breakaway axle coupling assembly according to claim 1, wherein said second coupler comprises a one-piece split coupler having a female connecting end configured to extend axially beyond the distal end of the second axle section of the vehicle drive axle.

3. The breakaway axle coupling assembly according to claim 2, wherein the male and female connecting ends of said first and second couplers define respective pin holes configured to align upon assembly of breakaway axle coupling assembly on the vehicle drive axle.

4. The breakaway axle coupling assembly according to claim 3, wherein said means for joining said first and second couplers comprises a shear pin extending through the aligned pin holes of the male and female connecting ends.

5. The breakaway axle coupling assembly according to claim 4, wherein said shear pin incorporates axial-spaced spring loaded balls adapted for holding said shear pin in position within said breakaway axle coupling assembly.

6. The breakaway axle coupling assembly according to claim 1, wherein said first coupler defines an internal keyway configured to receive an elongated key located in a recessed keyseat formed with the distal end of the first axle section of the vehicle drive axle.

7. The breakaway axle coupling assembly according to claim 1, wherein said second coupler defines an internal keyway configured to receive an elongated key located in a recessed keyseat formed with the distal end of the second axle section of the vehicle drive axle.

8. The breakaway axle coupling assembly according to claim 1, wherein said first coupler comprises a two-piece split coupler having cooperating halves configured to fasten together around the distal end of the first axle section of the vehicle drive axle.

9. The breakaway axle coupling assembly according to claim 8, wherein said first coupler further comprises a male connecting end configured to extend axially beyond the distal end of the first axle section of the vehicle drive axle.

10. The breakaway axle coupling assembly according to claim 9, wherein said second coupler comprises a two-piece split coupler having cooperating halves configured to fasten together around the distal end of the second axle section of the vehicle drive axle.

11. The breakaway axle coupling assembly according to claim 10, wherein said second coupler further comprises a female connecting end configured to extend axially beyond the distal end of the second axle section of the vehicle drive axle.

12. The breakaway axle coupling assembly according to claim 11, wherein the male and female connecting ends of said first and second couplers define respective pin holes configured to align upon assembly of breakaway axle coupling assembly on the vehicle drive axle.

13. The breakaway axle coupling assembly according to claim 12, wherein said means for joining said first and second couplers comprises a shear pin extending through the aligned pin holes of the male and female connecting ends.

14. An off-road vehicle incorporating an engine, a drivetrain and a plurality of wheels, the drivetrain including at least one of a front and rear differential and a plurality of vehicle drive axles, at least one of the vehicle drive axles comprising first and second axle sections, the first axle section having a proximal end operatively connected to the differential and an opposite distal end, and the second axle section having a proximal end operatively connected to a wheel of the vehicle and an opposite distal end, and said off-road vehicle further comprises:

a breakaway axle coupling assembly operatively connecting together the distal ends of said first and second axle sections of said vehicle drive axle, and wherein said breakaway axle coupling assembly comprises:

a first coupler located at the distal end of said first axle section of said vehicle drive axle, and wherein said first coupler comprises a one-piece split coupler having a male connecting end configured to extend axially beyond the distal end of the first axle section of the vehicle drive axle;

a second coupler located at the distal end of said second axle section of said vehicle drive axle; and means for joining said first and second couplers together at an intermediate stress concentration point in said vehicle drive axle, such that said breakaway axle coupling assembly functions as a safeguard configured to breakaway upon torsion fatigue failure of the vehicle drive axle.

15. The off-road vehicle according to claim 14, wherein said second coupler comprises a one-piece split coupler having a female connecting end configured to extend axially beyond the distal end of the second axle section of the vehicle drive axle.

16. The off-road vehicle according to claim 15, wherein the male and female connecting ends of said first and second couplers define respective pin holes configured to align upon assembly of breakaway axle coupling assembly on the vehicle drive axle.

17. The off-road vehicle according to claim 16, wherein said means for joining said first and second couplers comprises a shear pin extending through the aligned pin holes of the male and female connecting ends.

18. A breakaway axle coupling assembly for an off-road vehicle, the off-road vehicle incorporating an engine, a drivetrain and a plurality of wheels, and the drivetrain including at least one of a front and rear differential and a plurality of vehicle drive axles, at least one of the vehicle drive axles comprising first and second axle sections, the first axle section having a proximal end operatively connected to the differential and an opposite distal end, and the second axle section having a proximal end operatively connected to a wheel of the vehicle and an opposite distal end, said breakaway axle coupling assembly comprising:

a first coupler for being located at the distal end of the first axle section of the vehicle drive axle, and wherein said first coupler comprises a two-piece split coupler having cooperating halves configured to fasten together around the distal end of the first axle section of the vehicle drive axle;

a second coupler for being located at the distal end of the second axle section of the vehicle drive axle; and means for joining said first and second couplers together at an intermediate stress concentration point in the vehicle drive axle, such that said breakaway axle coupling assembly operatively connects together the distal ends of the first and second axle sections and functions as a safeguard configured to breakaway upon torsion fatigue failure of the vehicle drive axle.

* * * * *